(12) United States Patent  (10) Patent No.: US 8,776,206 B1
Goldstein  (45) Date of Patent: *Jul. 8, 2014

(54) METHOD, A SYSTEM, AND AN APPARATUS FOR CONTENT SECURITY IN COMPUTER NETWORKS

(75) Inventor: Leonid Goldstein, Costa Mesa, CA (US)

(73) Assignee: GTB Technologies, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/219,615

(22) Filed: Sep. 2, 2005

Related U.S. Application Data

(63) Continuation-in-part of application No. 10/968,218, filed on Oct. 18, 2004, now abandoned.

(51) Int. Cl.
*G06F 15/16* (2006.01)

(52) U.S. Cl.
USPC ............................. 726/11; 713/154; 709/224

(58) Field of Classification Search
USPC ........................... 726/11, 12, 13, 30; 713/154
See application file for complete search history.

(56) References Cited

U.S. PATENT DOCUMENTS

| | | | | |
|---|---|---|---|---|
| 5,161,192 A * | 11/1992 | Carter et al. | ................... | 713/162 |
| 5,917,900 A * | 6/1999 | Allison et al. | ................ | 379/229 |
| 6,067,569 A * | 5/2000 | Khaki et al. | ................... | 709/224 |
| 6,076,168 A * | 6/2000 | Fiveash et al. | ................... | 726/11 |
| 6,618,735 B1 * | 9/2003 | Krishnaswami et al. | ............. | 1/1 |
| 6,707,817 B1 * | 3/2004 | Kadambi et al. | ............... | 370/390 |
| 6,772,346 B1 * | 8/2004 | Chess et al. | ..................... | 716/13 |
| 6,857,009 B1 * | 2/2005 | Ferreria et al. | ................ | 709/219 |
| 7,047,407 B2 * | 5/2006 | Itoh et al. | ....................... | 713/168 |
| 7,093,023 B2 * | 8/2006 | Lockwood et al. | ........... | 709/231 |
| 7,127,738 B1 * | 10/2006 | Jackson | ................... | 439/620.01 |
| 7,127,740 B2 * | 10/2006 | Campagna | ....................... | 726/12 |
| 7,269,733 B1 * | 9/2007 | O'Toole, Jr. | .................. | 713/175 |
| 7,308,431 B2 * | 12/2007 | Asokan et al. | ................. | 705/67 |
| 7,353,533 B2 * | 4/2008 | Wright et al. | ..................... | 726/1 |
| 7,516,492 B1 * | 4/2009 | Nisbet et al. | .................... | 726/27 |
| 7,716,330 B2 * | 5/2010 | Kulig et al. | ................... | 709/225 |
| 7,756,843 B1 * | 7/2010 | Palmer | ......................... | 707/694 |
| 7,761,706 B2 * | 7/2010 | Lambert | ....................... | 713/165 |
| 2001/0056550 A1 * | 12/2001 | Lee | ............................... | 713/201 |
| 2002/0040389 A1 * | 4/2002 | Gerba et al. | .................. | 709/219 |
| 2002/0091928 A1 * | 7/2002 | Bouchard et al. | ............. | 713/178 |
| 2002/0162026 A1 * | 10/2002 | Neuman et al. | ............... | 713/201 |
| 2002/0169954 A1 * | 11/2002 | Bandini et al. | ................ | 713/153 |
| 2003/0028761 A1 * | 2/2003 | Platt | .............................. | 713/150 |

(Continued)

OTHER PUBLICATIONS

Reconnex inSight Platform: Total Information Visibility for Insider Threats even on Gigabit Networks URL: http://www.reconnex.net/products/.

(Continued)

*Primary Examiner* — Fikremariam A Yalew

(74) *Attorney, Agent, or Firm* — DLA Piper LLP (US)

(57) ABSTRACT

The present invention relates to a method, a system, and an apparatus for protecting data in a computer network. A device is placed on a network edge in such a way, that all outgoing data has to pass through it. Separately, a set of protected files that are not allowed to leave the network is defined. The device checks the passing data for the presence of the data from the defined set (protected data). If a threshold amount of the protected data is present, the device interrupts the connection or takes another appropriate action.

20 Claims, 5 Drawing Sheets

(56) References Cited

U.S. PATENT DOCUMENTS

| | | | |
|---|---|---|---|
| 2003/0074578 A1* | 4/2003 | Ford et al. | 713/200 |
| 2003/0093664 A1* | 5/2003 | Miyoshi et al. | 713/150 |
| 2003/0110229 A1* | 6/2003 | Kulig et al. | 709/207 |
| 2003/0110272 A1* | 6/2003 | du Castel et al. | 709/229 |
| 2003/0171995 A1* | 9/2003 | Dezonno et al. | 705/26 |
| 2003/0221013 A1* | 11/2003 | Lockwood et al. | 709/231 |
| 2004/0002978 A1* | 1/2004 | Wookey et al. | 707/10 |
| 2004/0049695 A1* | 3/2004 | Choi et al. | 713/200 |
| 2004/0049701 A1* | 3/2004 | Le Pennec et al. | 713/201 |
| 2004/0054779 A1* | 3/2004 | Takeshima et al. | 709/225 |
| 2004/0123153 A1* | 6/2004 | Wright et al. | 713/201 |
| 2004/0129140 A1* | 7/2004 | Park et al. | 96/59 |
| 2004/0146006 A1* | 7/2004 | Jackson | 370/230 |
| 2004/0151135 A1* | 8/2004 | Kitahama et al. | 370/328 |
| 2004/0199490 A1* | 10/2004 | Peled et al. | 707/1 |
| 2004/0213224 A1* | 10/2004 | Goudreau | 370/389 |
| 2004/0213272 A1* | 10/2004 | Nishi et al. | 370/401 |
| 2004/0249812 A1* | 12/2004 | Scoredos | 707/9 |
| 2004/0260924 A1* | 12/2004 | Peled et al. | 713/166 |
| 2005/0027980 A1* | 2/2005 | Peled et al. | 713/164 |
| 2005/0081041 A1* | 4/2005 | Hwang | 713/176 |
| 2005/0086532 A1* | 4/2005 | Lotspiech et al. | 713/201 |
| 2005/0120229 A1* | 6/2005 | Lahti | 713/188 |
| 2005/0132046 A1* | 6/2005 | de la Iglesia et al. | 709/225 |
| 2005/0195832 A1* | 9/2005 | Dharmapurikar et al. | 370/395.31 |
| 2005/0198059 A1* | 9/2005 | Chou | 707/102 |
| 2005/0243789 A1* | 11/2005 | Dinello et al. | 370/341 |
| 2009/0063657 A1* | 3/2009 | Samuels et al. | 709/218 |
| 2010/0043047 A1* | 2/2010 | Archer et al. | 726/1 |

OTHER PUBLICATIONS

Reconnex iGuard Content Monitoring Appliance for Protection Against Insider Threat URL: http://www.reconnex.net/products/iguard.asp.

Reconnex iControllerl Content REgistration Appliance for Sensitive and Proprietaryt Content URL: http://www.reconnex.net/products/icontroller/asp.

Vontu:: Products:: Vontu Architecture URL: http://www.vontu.com/products/architecture.asp.

PortAuthority URL: http://www.portauthoritytech.com/products/prod_arch.html.

* cited by examiner

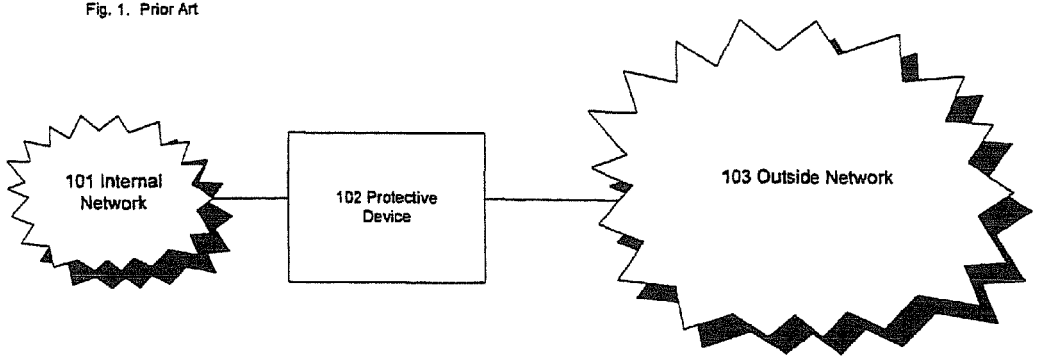
Fig. 1. Prior Art
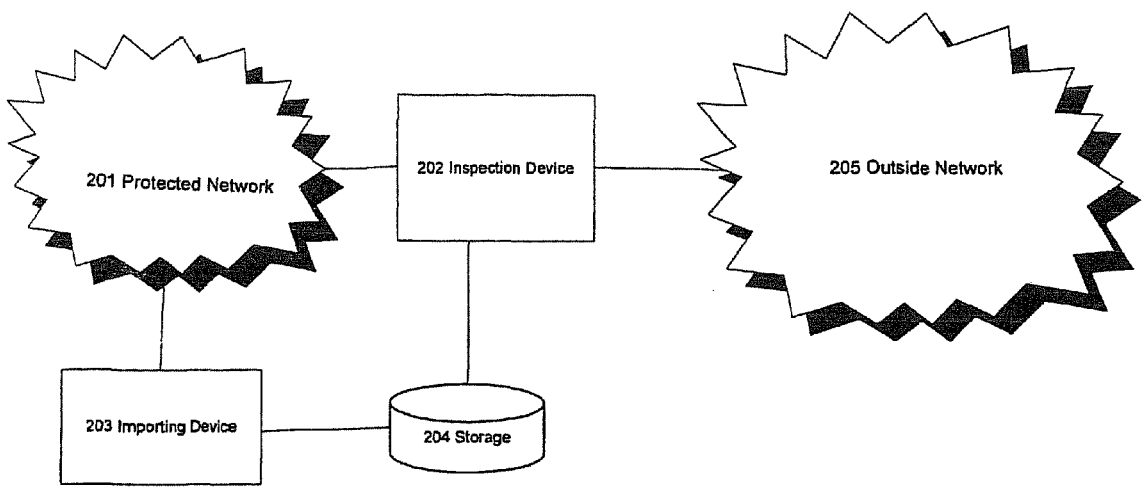
Fig. 2. Network Layout according to the Invention

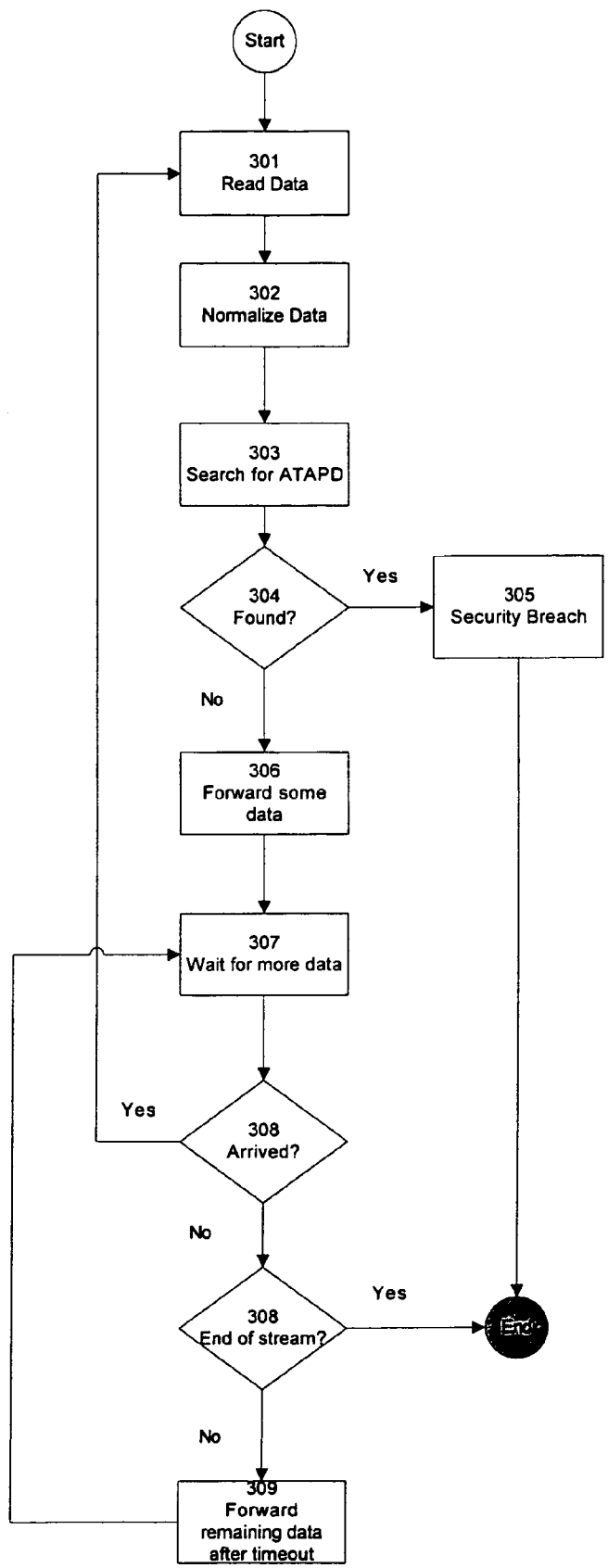
Fig. 3 Inspection Device flowchart

METHOD, A SYSTEM, AND AN APPARATUS FOR CONTENT SECURITY IN COMPUTER NETWORKS

This application is a continuation-in-part of U.S. patent application Ser. No. 10/968,218 filed Oct. 10, 2004 entitled "Method, A System, and An Apparatus for Content Security in Computer Networks".

BACKGROUND OF THE INVENTION

1. Field of the Invention

The present invention relates to the field of the computer network security.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Security is an important concern in computer networks. Networks are protected from illegal entry via security measures such as firewalls, passwords, dongles, physical keys, isolation, biometrics, and other measures. FIG. 1 illustrates an example of prior art security in a network configuration. A Protective Device 102 resides between an Internal Network 101 and an Outside Network 103. There are multiple methods of content filtering, designed to protect the inside network (or a single computer) from entering of harmful data from the outside network. For example, it is done by cataloguing allowed and banned URLs, web sites, web domains or through real time scan for forbidden words or through blocking certain IP addresses and ports. The example of FIG. 1 is typical of prior art security schemes in that it is principally designed to limit entry to the network. However, there are fewer methods to prevent exits from a protected network in the form of data leaks. This is unfortunate, because a significant threat in networking is the leaking of confidential materials out of the network. Some methods of protection include recognizing predefined keywords in the outbound data and recognizing simple patterns, such as a 16-digit credit card numbers. When such identifiers are recognized and when such outbound data has not been authorized, the data transmission may be stopped. These prior art methods are inadequate for the task of providing security against data leakage.

SUMMARY OF THE INVENTION

The present invention relates to a method, a system, and an apparatus for protecting data in a computer network. A device is placed on a network edge in such a way that all outgoing data has to pass through it. Separately, a set of protected files, data from which is not allowed to leave the network, is defined. A set of rules is defined as well. A set of allowed files or files, excluded from consideration, may be defined as well. The device checks the passing data for the presence of the data from the defined set (protected data). If a threshold amount of the protected data is present, the device interrupts the connection or takes another appropriate action.

BRIEF DESCRIPTION OF THE DRAWING

FIG. 1 illustrates a prior art network system.
FIG. 2 illustrates a network system according to the invention.
FIG. 3 is a flow diagram illustrating the operation of an Inspection Device according to the invention.

DETAILED DESCRIPTION OF THE INVENTION

Figure 4:
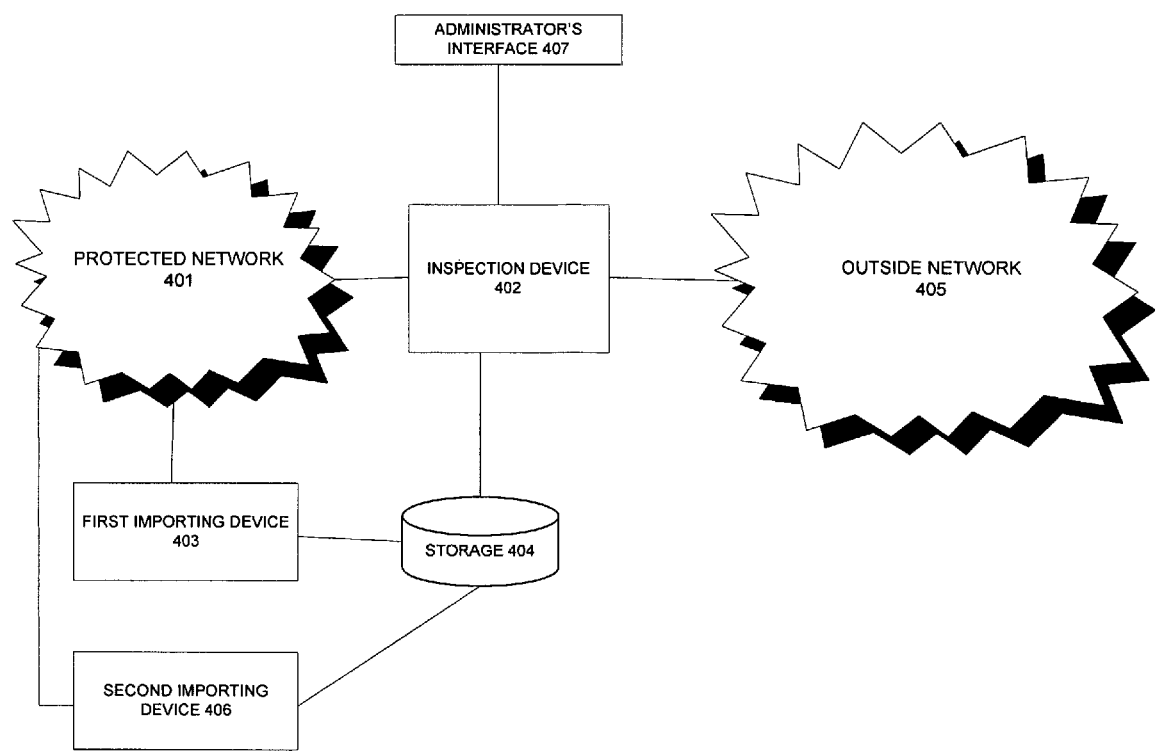
FIG. 4 illustrates an alternate network system of the invention.

In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

FIG. 2 illustrates a network configuration according to the invention. An Inspection Device 202 is connected to a Protected Network 201 in such a way that it is able to inspect all the outbound traffic from the Protected Network 201 to the Outside Network 205. An Importing Device 203 is connected to the Protected Network 201 as well, and a Storage device 204 is set up in such a way that it is connected to both Inspection Device 202 and Importing Device 203.

The Inspection Device 202 typically comprises a computer or other networking device, with a CPU, RAM and networking means. Nevertheless, the Inspection Device 202 may comprise multiple physical devices. For example, it may comprise a Layer 4 switch and a computer connected to it.

The Importing Device 203 may comprise a stand alone computer or other networking device with a CPU, RAM. The Importing Device 203 and the Inspection Device 202 may be combined into one physical device.

Storage device 204 may comprise a stand alone device in the network or be combined with the Inspection Device 202 and/or the Importing Device 203. The Storage device 204 may comprise a relational database, such as MySQL.

Importing Device operation

The function of the Importing Device 203 is to import the data that needs to be protected, process it and to store the results of this processing in the Storage device 204. In one embodiment of the invention the data objects being imported are referred to as files, although not only operating system files may be imported. A system administrator, operating the system, selects the protected data using one of the multiple methods, including:

Specifying Universal Resource Identificators (URIs);
selecting folders and single files on one or multiple computers in the network;
specifying an email account to listen to;
creating database queries to execute to obtain the data; or
any combination of the methods above.

For further discussion in an example embodiment, assume that the protected data is provided as files and folders. The Importing Device 203 inspects the data and imports each file into the Storage device 204. Importing may be done in many ways, including:

copying all the data from the file to the storage;
creating a search index of the imported data in the storage;
creating a signature of the file, comprising one digital digest on the full file;
creating a signature of the file, comprising multiple digital digests, computed on different sequences of the file;
manual copying of some data through a clipboard; or
any combination of the methods above.

One embodiment of the digital digest computation is MD5 on the data, although other algorithms may be used as well without departing from the scope of the present invention.

The Importing Device 203 may operate manually or automatically. In the automatic mode, the Importing Device would monitor the selected files and folders and re-import files when they change or are added. Each file may carry additional attributes, such as secrecy level, IP addresses and protocols that control its ability to be exported, etc. Further, data that is always allowed may be imported similarly.

Inspection Device Operation

The function of the Inspection Device 202 is to monitor the outbound traffic for the presence of the protected data. It does that using the Storage device 204. If the amount of the protected data, being transferred in a stream exceeds a predetermined threshold (for example, the length of the data sequence coinciding with the data in the Storage exceeds 4096 bytes), a security breach is declared and a predefined action is taken by the Inspection Device 202. Among the possible actions:

log the security breach;
   alert security personnel;
   stop the transmission of the offending stream;
   shut down the traffic between the protected network and outside world; or
   any a combination of the above.

If the threshold amount of the protected data is not detected, the Inspection Device 202 allows the inspected data to be sent to the Outside Network 205.

In one embodiment, the Inspection Device 202 should recognize the protected data at any location in the data stream. Moreover, it should recognize the protected data even if only a part of a protected file, starting with an arbitrary byte, is present.

The protected data may be modified prior to being sent out. In order to protect against some modifications, such as file format changes, the data should be normalized. The Importing Device 203 normalizes the data prior to storing it in the Storage device 204, and the Inspection Device 202 normalizes the data prior to comparing it to the data in the storage. Normalization may include removing formatting information, converting the complex file formats to the text, etc.

In another example embodiment, assume that the criterion of the security breach is the presence of the continuous sequence of the protected data of the length L. Referring to FIG. 3, the following operations are executed by the Inspection Device 202 for each outbound data stream:

Read and retain all the available data (step 301). Normalize the read data (step 302). Search for the protected data in the normalized data (step 303). If threshold amount of the protected data (ATAPD) is found (check 304), recognize the situation as a security breach, interrupt the data stream and alert the Administrator (step 305), then go to End. Otherwise, forward all the original data, which is determined not to be a part of ATAPD, to its destination (step 306). At this time, there may remain a small buffer of unsent data. Wait for more incoming data for up to a predefined timeout (step 307). (In one embodiment, the recommended timeout is 500 ms). If the data arrived (check 308), go to step 301. If this is the end of the data stream (check 309), go to the End. If no additional data had arrived until the timeout expired, forward the remaining data to its destination, while retaining the copy (step 310).

Further, when the timeout is concerned, the algorithm may distinguish between the situation when it can not determine whether some of the data in the end is part of ATAPD, and when it had determined that it is. In the former case the timeout is shorter, than in the latter.

Discovery of ATAPD

As explained above, the operation of the Inspection Device is discovery of the protected data (which is stored in the Storage) in the outbound data streams. In one embodiment, it is recommended to load the content of the Storage or significant part of it into RAM of the Inspection Device. There are multiple methods of search for ATAPD.

1) Full Search. Starting at each byte in the outbound data, compare the data with all the data in the Storage.

2) Indexed Search. The protected data is in the Storage and is indexed for search. At the intervals of L/2 or smaller, select a word or a phrase with the length of less than L/2 in the inspected data. Search for this word or phrase in the Storage. If found, compare the data on the both sides of the found byte sequence (i.e. before and after). If the total length of the coinciding sequence is larger, than L—there is ATAPD and a security breach is discovered. Otherwise, it is not.

3) A digital digest is computed on each imported file. If in time of inspection the structure of the data is known and beginning and the end of a possibly protected file are known, a digital digest is computed on the data from the beginning to the end. Then, the search for that digest is done in the storage. If it is found—there is ATAPD and a security breach is discovered.

4) In time of importing, each file is divided into parts with the length less than L, and a digital digest is computed on each part and saved into the database. (For example, the MD5 algorithm can be used for computing the digest). The digests are saved into the storage, and the protected data itself is not saved. In one embodiment, the division is done into parts of equal length L0, except for the remainder of the file of the length less than L0. For example, L=4096 and L0=128, in bytes. In this embodiment, in time of inspection, fragments of length L0 are selected in the normalized data with the distances of no more than L−L0 between them. The digests are computed on L0 bytes of the normalized data, starting with every byte of every fragment. Then, the algorithm searches each computed digest in the Storage. Let us assume that the digest, computed starting at position B0, is found in the Storage. The data between B0 and B0+L0 is considered equivalent to the protected data. Then, the algorithm computes the digests in the positions B0+L0, B0+2×L0, B0+3×L0 . . . and in the positions B0−L0, B0−2×L0, B0−3×L0 . . . and tries to find them in the Storage, adjacent one to another. This way, it determines the longest sequence between B0−C and B0+D, which is equivalent to the protected data. If its length is more than L-ATAPD is found and a security breach is discovered.

5) This embodiment uses a technique referred to herein as "orientation points." For each octet of the data stream define the function F( ) such as CRC (Cyclic Redundancy Sum, 32 bit) over an octet sequence in that stream of length l=32, starting with this octet. Select as an orientation point (OP) every octet I0, that function F( ) can be computed on it and F( ) has a strict local minimum in the radius N, i.e. F(I0)<F(x) for each octet x on the sequence [I0−N, I0+N], except for I0. N=1024. It should be noted that selection of the function F( ) and radius N may differ in different embodiments. In time of importing, OPs are computed on the data. Each file is divided into fragments between OPs, and a digest computed on each fragment and stored in the storage. In time of inspection, OPs are computed in the inspected data, and the digest is computed on each data fragment between OPs. Then, the search for that digest is done in the storage. If the digest is found in the Storage—the fragment is considered equivalent to a fragment of the protected data. If there are one or more consecutive fragments in the inspected data with equivalents in the Storage and their total length exceeds L-ATAPD is found and a security breach is discovered.

The invention is described in application to protecting the data in an internal network from leaking to outside network. It may be used to protect the inside network from harmful content, such as viruses, from the outside network. To practice the invention in this way, the places of the Protected Network 201 and Outside Network 205 are swapped; i.e. whole Internet is viewed as the Protected Network 201 and the internal network is considered as Outside Network 205.

Additional Embodiment

Another embodiment of the invention is illustrated in FIG. 4. This embodiment may include an optional second importing device and includes an interface that permits an administrator to define security rules for the network and for network operation. FIG. 4 illustrates a network configuration according to the alternate embodiment of the invention.

An Inspection Device 402 is connected to a Protected Network 401 in such a way that the outbound traffic from the Protected Network 401 to the Outside Network 405 comes through the Inspection Device 402. A First Importing Device 403 and A Second Importing Device 406 are also connected to the Protected Network 401. The system includes a Storage Device 404 that is coupled to Inspection Device 402, First Importing Device 403, and Second Importing Device 406. An Administrator's Interface 407 is coupled to the Inspection Device 402.

The Inspection Device 402 typically comprises a computer or other networking device, with a CPU, RAM and networking means. This is by way of example only. In other embodiments, the Inspection Device 402 may comprise multiple physical devices. For example, it may comprise a Layer 4 switch and an associated computer.

The First Importing Device 403 may comprise a stand-alone computer or other networking device (having appropriate processing and storage capabilities). In one embodiment, the First Importing Device 403 and the Inspection Device 402 may be combined into a single physical device.

The Second Importing Device 406 is optional. The Second Importing Device 406 may comprise a stand-alone computer or other networking device (having appropriate processing and storage capabilities). The Second Importing Device 406 and/or the First Importing Device and/or the Inspection Device 402 may be combined into one physical device.

Storage device 404 may comprise a stand-alone device with its own processing and memory capabilities in the network or be combined with the Inspection Device 402 and/or the First Importing Device 403. The Storage device 404 may comprise a relational database, such as MySQL.

Alternately, Inspection Device 402, First Importing Device 403, Storage 404, and Second Importing Device 406 may all be implemented as a single device.

The Administrator's Interface 407 is a computer program that an Administrator uses to specify rules for the Inspection Device 402. It may run on Inspection Device 402 itself or on another computer.

First and Second Importing Device Operation

The function of the First Importing Device 403 is to import the data that needs to be protected, process it and to store the results of this processing in the Storage Device 404. In one embodiment of the invention the data objects being imported are referred to as files, although not only operating system files may be imported. A system administrator, operating the system, selects the protected data using one of the multiple methods as described above with respect to Importing Device 202. In an example embodiment, assume that the protected data is provided as files and folders. The First Importing Device 403 inspects the data and imports each file into the Storage Device 404. Importing may be done using any of the methods described above with respect to Importing Device 202.

The First Importing Device 403 may operate manually or automatically. In the automatic mode, the Importing Device would monitor the selected files and folders and re-import files when they change or new files are added. Each file may carry additional attributes, such as secrecy level, IP addresses and protocols that control its ability to be exported, etc.

There may be situations where documents in an organization may share common parts, such as a header, a disclaimer or a chapter. When unprotected documents share these parts with protected ones, they may trigger an alert, creating false positives. The function of the Second Importing Device 406 is to import excluded files. The content of the excluded files is eliminated from the consideration in the time of the inspection. The Second Importing Device 406 operates similarly to the First Importing Device 403, but the imported files are saved into a database of excluded files. In an example embodiment, the following additional steps are implemented in the importing of the excluded files:

a) identify the parts of the protected files in the database that match content of the excluded files;

b) remove the matching parts from the protected files in the database;

c) if the protected files are indexed, re-compute the indexes.

Inspection Device 402 Operation

The function of the Inspection Device 402 is to monitor the outbound traffic for the presence of the protected data. It does that using the Storage device 404. If the amount of the protected data, being transferred in a stream exceeds a predetermined threshold (for example, the length of the data sequence coinciding with the protected data in the Storage exceeds 4096 bytes), a security breach is declared and a predefined action is taken by the Inspection Device 402. Among the possible actions:

log the security breach;

alert security personnel;

stop the transmission of the offending stream;

shut down the traffic from the computer involved;

shut down the traffic between the protected network and outside world; or any combination of the above.

If the threshold amount of the protected data is not detected, the Inspection Device 402 allows the inspected data to be sent to the Outside Network 405.

In the preferred embodiment, the Inspection Device 402 recognizes the protected data at any location in the data stream. Moreover, it recognizes the protected data even if only a part of a protected file, starting with an arbitrary byte, is present.

The protected data may be modified prior to being sent out. In order to protect against some modifications, such as file format changes, the data should be normalized. The Importing Device 403 normalizes the data prior to storing it in the Storage device 404, and the Inspection Device 402 normalizes the data prior to comparing it to the data in the storage. Normalization may include removing formatting information, converting the complex file formats to the text, etc.

Figure 5:
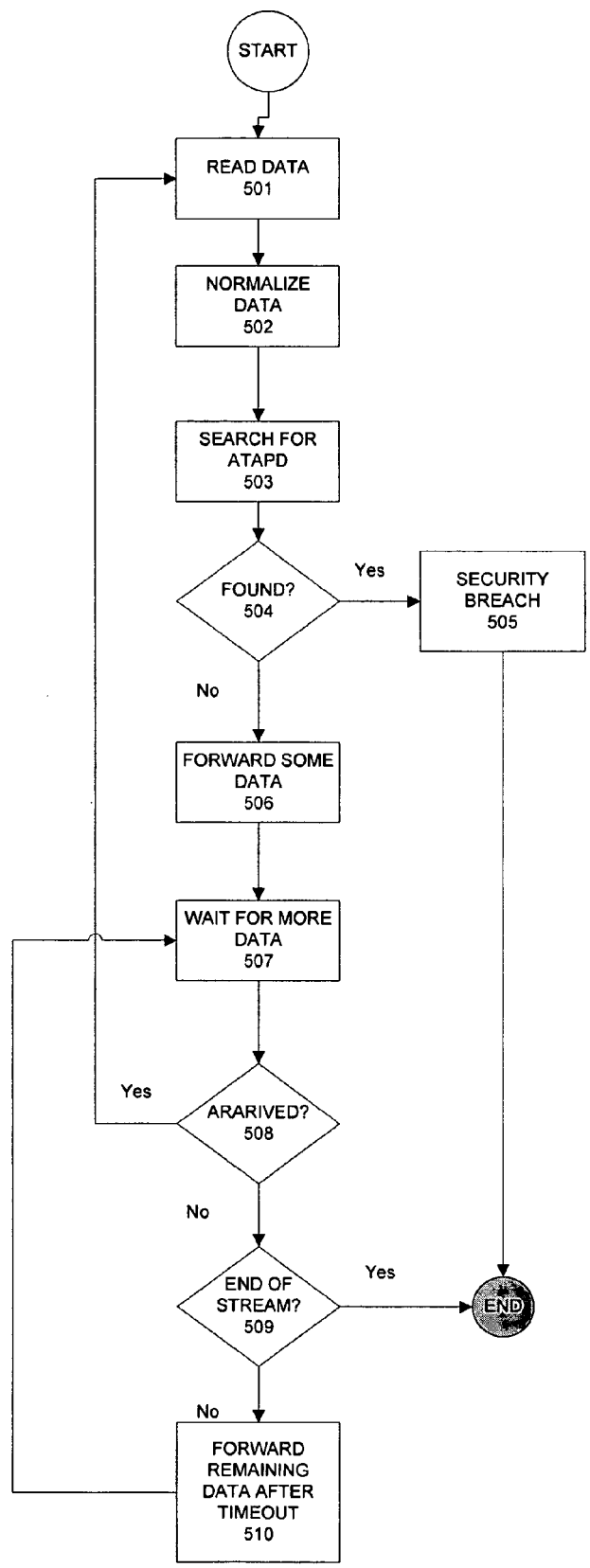
FIG. 5 is a flow diagram illustrating operation of the invention of FIG. 4.

In another example embodiment, assume that the criterion of the security breach is the presence of the continuous sequence of the protected data of the length L. Referring to FIG. 5, the following operations are executed by the Inspection Device 402 for each outbound data stream:

Read and retain all the available data (step 501). Normalize the read data (step 502). Search for the protected data in the normalized data (step 503). If threshold amount of the protected data (ATAPD) is found (check 504), recognize the situation as a security breach, interrupt the data stream and alert the Administrator (step 505), then go to End. Otherwise, forward all the original data, which is determined not to be a part of ATAPD, to its destination (step 506). At this time, there may remain a small buffer of unsent data. Wait for more incoming data for up to a predefined timeout (step 507). (In one embodiment, the recommended timeout is 500 ms). If the data arrived (check 508), go to step 501. If this is the end of the data stream (check 509), go to the End. If no additional data had arrived until the timeout expired, forward the remaining data to its destination, while retaining the copy (step 510).

Further, when the timeout is concerned, the algorithm may distinguish between the situation when it can not determine whether some of the data in the end is part of ATAPD, and when it had determined that it is. In the former case the timeout is shorter, than in the latter.

Strict Mode Embodiment

Another embodiment for Importing Device and Inspection Device operation is referred to as the Strict Mode. In Strict Mode operation, the Importing Device 403 imports files into a database of allowed files.

In the Inspection Device 402, a length threshold is set. Data processing is done similarly to that described in conjunction with FIG. 3, but a security breach is declared only if the transmitted data does NOT match the data in the database. A threshold length is specified (which can optionally equal 0), and transmission of the data stream is allowed, if the length of the non-matching data does not exceed this threshold.

The operation of the Inspection Device 402 with respect to discovery of ATAPD and strict mode operation is similar to that described above for Inspection Device 202.

Administrator's Interface

Effective management of the system for controlling data transfer should allow an administrator to specify and modify a number of rules. These rules may, for example, take form of a rules file in the Inspection Device 402 and are set using an Administrator's Interface 407. The Administrator's Interface 407 may run as a program on a remote computer, possibly making use of a browser. It may be even a text editor on the Inspection Device 402.

Each rule may include any of the following parameters of the computers, involved in the data transmission (i.e. the transmission source and the destination):
  IP address
  Email address
  Presence and the type of encryption
  Direction of initial connect (inside out or outside in)
  Time
  Date
  Application Level Protocol Also it specifies for each transmission whether it should be inspected or not and what action should be taken, if a security breach is discovered. Below are examples of possible actions.

BREACH_LOG—log the breach to the security log, do not stop transmission;

BREACH_ALERT—same as BREACH_LOG, but immediately alert Administrator (typically using an email);

BREACH_BLOCK—stop current transmission and alert Administrator. If the email of the human originator of the transmission is known, he or she may be notified as well;

BREACH_BLOCK_EXT—same as BREACH_BLOCK, but prevent any transmission from the same IP or computer name for the pre-defined (typically 24 hours) period of time or until Administrator permits;

BREACH_BLOCK_NET—prevent any transmission from the network, except for the urgent notification to the Administrator.

Rules Protocol

In one embodiment of the invention, the rules set is comprised of object definitions and the rules themselves. Object definitions consist of transmission descriptions and object definitions precede the rules. In other words, the object is matched first and then the first rule for that object is applied. If no object/rule combination is matched, then the transmission is allowed and no action is taken.

For purposes of example, a sample object and rules structure in Backus-Naur Form is described below. The rules structure may be extended or changed.

object=object-name boolean-expression-of(simple-object-name) [comment]
object-name=token
simple-object-name=token
comment=quoted string; human readable comment
Example of definition of Obj-X:
Obj-X obj1 AND obj2 AND ~obj3 OR obj4
simple-object=simple-object-name

| "proto" protocol | | |
|---|---|---|
| ["src" address] | ; | always inside |
| ["dest" address] | ; | always outside |
| ["init" initialized] | ; | where connection comes from |
| [time] | ; | when appplies | protocol="SMTP"|"POP"|"HTTP"|"FTP"|"other"
address=ip-address [/mask][:ports]|name[:ports]|spec-address
ports=number [−number]*["," number [−number]]
initialized="INSIDE"|"OUTSIDE"
time=time-once|time-weekly|time-daily
time-once=asctime-date[−asctime-date]*["," asctime-date [−asctime-date]]
time-weekly=wktime[−wktime]*["," wktime [−wktime]]
time-daily=daytime[daytime]*["," daytime [−daytime]]
spec-address=smtp-sender|smtp-recipient|pop-recipient; special addresses—for application level protocol
smtp-sender=email-expression*["," email-expression]
smtp-recipient=email-expression*["," email-expression]
pop-recipient=email-expression*["," email-expression]
email-expression=token"@"token"."token
token=1*CHAR
number=1*DIG
Time is based on RFC 2616 time:
weektime=wkday time
daytime=time
asctime-date=wkday SP date3 SP time SP 4DIGIT

| date1 | = 2DIGIT SP month SP 4DIGIT |
| | ; day month year (e.g., 02 Jun 1982) |
| date2 | = 2DIGIT "-" month "-" 2DIGIT |
| | ; day-month-year (e.g., 02-Jun-82) |
| date3 | = month SP ( 2DIGIT | ( SP 1DIGIT )) |
| | ; month day (e.g., Jun 2) |
| time | = 2DIGIT ":" 2DIGIT ":" 2DIGIT |
| | ; 00:00:00 - 23:59:59 |
| wkday | = "Mon" | "Tue" | "Wed" |
| | | "Thu" | "Fri" | "Sat" | "Sun" |

-continued

| | |
|---|---|
| weekday | = "Monday" \| "Tuesday" \| "Wednesday" \| "Thursday" \| "Friday" \| "Saturday" \| "Sunday" |
| month | = "Jan" \| "Feb" \| "Mar" \| "Apr" \| "May" \| "Jun" \| "Jul" \| "Aug" \| "Sep" \| "Oct" \| "Nov" \| "Dec" | rule=rule-name object-names-list action
object-names-list=object-name*["," object-name]
action="BREACH_LOG"\|"BREACH_ALERT"
\|"BREACH_BLOCK"\|"BREACH_BLOCK_
EXT"\|"BREACH_BLOCK_NET"

An action is taken only if a security breach is discovered.

Figure 6:
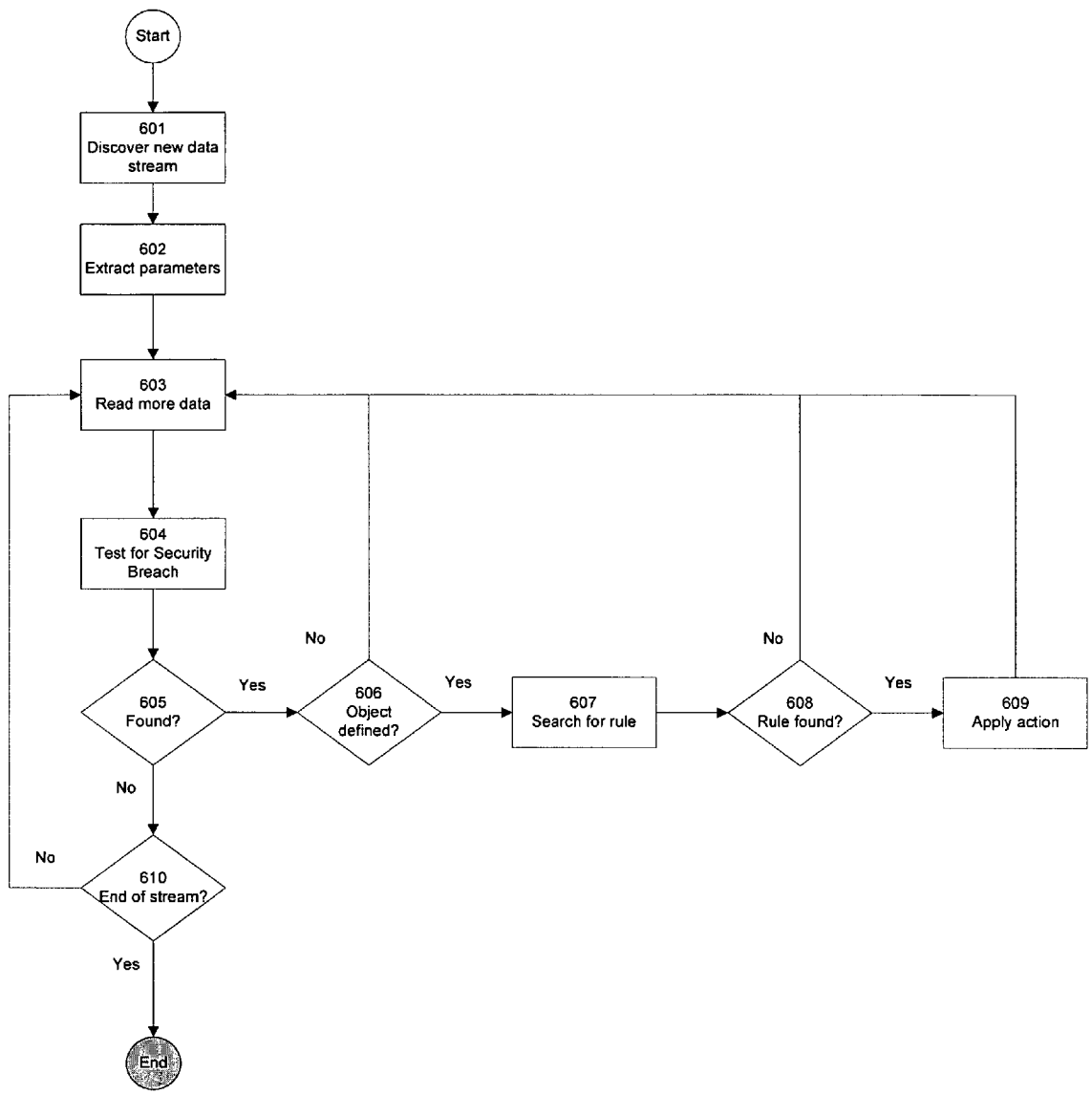
FIG. 6 is a flow diagram illustrating an embodiment of the invention.

Referring to FIG. 6, the following operations are executed by the Inspection Device 402 for each outbound data stream: Discover The beginning of the data stream is discovered at step 601. At step 602, the parameters of the datastream are determined, such as source IP address, destination IP address, direction (inside-out or outside-in), protocol type, source and destination email (for email protocols), presence of encryption etc. More data is read at step 603. The data is tested for the security breach, as described above at step 604. If the security breach is found at decision block 605 consult the rules. Considering the parameters, of the stream and the current date and time, try to find the correspondent object in the rules. If it is found (check 606), search for the rules for this object (step 607). If the rule is found (check 608), apply the action, stated in the rule (step 609). The action is to log the breach, or to alert the Administrator, or to block the stream, or to block the stream and all consequent streams from the same computer. If there is no correspondent object, or there is no rule for the found correspondent object—go back to step 603 and read more data. If there is end of stream (check 610)—go to the End (for this stream).

Thus, a method, a system, and an apparatus for protecting data in a computer network are described in conjunction with one or more specific embodiments. The invention is defined by the following claims and their full scope and equivalents.

I claim:

1. A system for controlling data transfers in a network comprising:
    a protective device for controlling data transfers in the network comprising;
    a first importing device coupled to said network and that is configured for identifying protected data residing in computer operating system files;
    a second importing device coupled to said network for identifying excluded data and wherein excluded data is excluded from the protected data;
    an outgoing transmission inspection/comparing device coupled to said network to read and inspect all content of a data transmission out of said network, including protected and excluded content, said outgoing transmission inspection/comparing device for comparing all content anywhere in a data stream to be transmitted out of said network with said protected data, said outgoing transmission inspection/comparing device detecting the presence of protected data in said content in said outgoing transmission, said outgoing transmission inspection/comparing device indicating a security breach when at least a threshold amount of said detected protected data of said content to be transmitted matches data of said protected data, wherein the outgoing transmission is interrupted when the threshold amount of protected data is found, and the outgoing transmission that is not a part of the threshold amount of protected data is transmitted out of the network;
    an administrator interface for defining on which data streams said inspection device will perform certain predefined actions;
    said administrator interface defining data streams by setting one or more attributes, including presence of encryption.

2. A system for controlling data transfers in a network comprising:
    a protective device for controlling data transfers in the network comprising;
    a storage device configured for storing an automatically generated search index of protected data residing in computer operating system files;
    an outgoing transmission inspection device coupled to the network to read and inspect all content transmissions out of the network, the inspection device for comparing said content of said data to be transmitted out of the network with the search index stored in the storage device the outgoing transmission inspection device detecting the presence of any part of the protected data in said content of said outgoing transmission, the outgoing transmission inspection device outputting a signal indicating a security breach when at least a threshold amount of the detected protected data to be transmitted matches protected data with the index in the storage device,
    wherein the outgoing transmission is interrupted when the threshold amount of protected data is found, and the outgoing transmission that is not a part of the threshold amount of protected data is transmitted out of the network.

3. The system of claim 2 further including a device coupled to the network for creating the search index of the protected data.

4. The system of claim 2 further including means of alerting security personnel on the security breach signal.

5. The system of claim 2 further including means of stopping transmission of the transmitted data on the security breach signal.

6. A system for controlling data transfers in a network comprising:
    a protective device for controlling data transfers in the network comprising;
    a storage device configured for storing automatically generated digital digests of protected data residing in computer operating system files;
    means for initializing a relational database query to select the protected data before fingerprinting it;
    an outgoing transmission inspection device coupled to the network to read and inspect all content transmissions out of the network, the inspection device computing digital digests on the content of the data to be transmitted out of the network, the outgoing transmission inspection device comparing digital digests on the content of the data to be transmitted out of the network with the digital digests, stored in the storage device, the outgoing transmission inspection device detecting the presence of digital digests of any part of the protected data in the content of said outgoing transmission, the outgoing transmission inspection device outputting a signal indicating a security breach when at least a threshold amount of the detected digital digests on the content of the data to be transmitted matches digital digests in the storage device,
    wherein the outgoing transmission is interrupted when the threshold amount of protected data is found, and the outgoing transmission that is not a part of the threshold amount of protected data is transmitted out of the network.

7. The system of claim 6 further including a device coupled to the network for computing the digital digests of the protected data.

8. The system of claim 6 further including means of alerting security personnel on the security breach signal.

9. The system of claim 6 further including means of stopping transmission of the transmitted data on the security breach signal.

10. The system of claim 6, further comprising an administrative interface for specifying inspection rules.

11. The system of claim 6, where protected data takes a form of computer files and multiple digital digests are computed for each file.

12. The system of claim 6, where protected data takes a form of database queries output and multiple digital digests are computed for each database query output.

13. The system of claim 11, further including a device coupled to the network for computing the digital digests of the protected data.

14. A method of controlling data transfer in a network comprising:
   in a protection device:
   controlling data transfers in the network by;
   identifying certain data in the network as protected data;
   automatically computing a search index on the protected data residing in computer operating system files;
   storing the search index in a permanent storage;
   read and inspect all content of the data in an attempt to transmit outgoing data out of the network;
   searching for the protected data in the content of the data to be transmitted out of the network;
   detecting any part of the text of the protected data in the content of the outgoing data;
   outputting a signal indicating a security breach when at least a threshold level of the detected protected data to be transmitted matches content in the data in the protected data,
   wherein the outgoing data is interrupted when the threshold level of protected data is found, and wherein the outgoing data that is not a part of the threshold level of protected data is transmitted out of the network.

15. The method of claim 14, further comprising a step of specifying rules to be used by a protection device, the rules based on parameters from the set:
   transmission source IP address
   transmission destination IP address
   transmission source email
   transmission destination email
   time
   date
   application level protocol.

16. The method of claim 15, further including a step of initializing a database query in order to select the protected data.

17. The method of claim 15, further including a step of alerting security personnel upon the security breach signal.

18. The method of claim 15, further including a step of stopping transmission of the data to be transmitted on the security breach signal.

19. The method of claim 15, where protected data takes a form of computer files and multiple digital digests are computed for each file.

20. The method of claim 15, where protected data takes a form of database queries output and multiple digital digests are computed for each database query output.

* * * * *